(12) United States Patent
Miller et al.

(10) Patent No.: US 7,721,553 B2
(45) Date of Patent: May 25, 2010

(54) METHOD AND APPARATUS FOR DETECTING A FLASHBACK CONDITION IN A GAS TURBINE

(75) Inventors: Sean A. Miller, Rockwall, TX (US); Ramarao V. Bandaru, Greer, SC (US)

(73) Assignee: Siemens Energy, Inc., Orlando, FL (US)

( * ) Notice: Subject to any disclaimer, the term of this patent is extended or adjusted under 35 U.S.C. 154(b) by 679 days.

(21) Appl. No.: 11/488,563

(22) Filed: Jul. 18, 2006

(65) Prior Publication Data
US 2008/0016877 A1    Jan. 24, 2008

(51) Int. Cl.
*F02C 7/25* (2006.01)
*F02C 3/00* (2006.01)
*F23R 3/14* (2006.01)

(52) U.S. Cl. .................... 60/779; 60/39.091; 431/22; 431/346

(58) Field of Classification Search .............. 60/779, 60/39.091, 39.11, 737, 748; 431/22, 346
See application file for complete search history.

(56) References Cited

U.S. PATENT DOCUMENTS

| | | | |
|---|---|---|---|
| 4,850,194 A * | 7/1989 | Fuglistaller et al. ........... 60/737 |
| 6,038,861 A * | 3/2000 | Amos et al. ................... 60/737 |
| 6,429,020 B1 | 8/2002 | Thornton et al. |
| 6,832,481 B2 * | 12/2004 | Koenig et al. ................. 60/737 |
| 6,854,258 B2 * | 2/2005 | Moriya et al. ............ 60/39.465 |
| 6,887,069 B1 * | 5/2005 | Thornton et al. .............. 431/12 |
| 6,895,759 B2 * | 5/2005 | Knoepfel ..................... 60/776 |
| 6,931,853 B2 * | 8/2005 | Dawson ....................... 60/737 |
| 7,171,813 B2 * | 2/2007 | Tanaka et al. ................. 60/737 |
| 7,197,880 B2 * | 4/2007 | Thornton et al. .............. 60/779 |
| 2004/0050057 A1 | 3/2004 | Bland et al. |
| 2004/0123652 A1 | 7/2004 | Benson et al. |
| 2004/0123653 A1 | 7/2004 | Benson |

FOREIGN PATENT DOCUMENTS

JP         2001-021145          * 1/2001

* cited by examiner

*Primary Examiner*—Ted Kim

(57) ABSTRACT

A method and apparatus for detecting a flashback condition in a fuel nozzle (8) of a gas turbine (10) are provided. The fuel nozzle is configured to pass a flow of air (20) to be mixed with a fuel in a premixing zone (11). The apparatus includes at least one fuel injecting device (12) positioned to define a point of fuel injection in the premixing zone. The apparatus further includes an electrode (16) positioned upstream of the point of fuel injection. The electrode is adapted to sense a flashback condition that can occur in the premixing zone.

7 Claims, 3 Drawing Sheets

METHOD AND APPARATUS FOR DETECTING A FLASHBACK CONDITION IN A GAS TURBINE

FIELD OF THE INVENTION

The present invention is generally related to gas (combustion) turbines, and, more particularly, to an installation arrangement for an ion-based flashback detector in a gas turbine.

BACKGROUND OF THE INVENTION

Flashback is one undesirable condition that can occur in state of the art combustion or burner systems, such as gas turbine combustion systems having one or more fuel nozzles configured to provide a premixing of fuel and air in a premixing zone located upstream of a burning zone (main combustion zone). The flashback condition generally occurs when a flame travels upstream from the main burning zone into the premixing zone, which is not intended to sustain combustion reactions. As a consequence, serious damage may occur to the combustion system, potentially resulting in a catastrophic malfunction of the system and a concomitant substantial financial loss.

The use of ion-sensing detectors (e.g., U.S. Pat. No. 6,429,020) and other devices, such as thermocouples and fiber optics, to detect flashback is well known. However, up to the present invention, flashback detection techniques (including those described in the foregoing patent) have commonly required the detection device to be at the premixing zone. That is, such techniques have typically required the detection device to be positioned downstream of one or more fuel injectors. This positioning requirement of the flashback detection device may entail a fairly complex integration into the fuel nozzle and/or installation arrangements subject to reduced reliability and/or burdensome access for reparability or servicing, once the combustion system is operationally deployed. Accordingly, for some combustor geometries it may be desirable to provide a flashback detection arrangement in a combustion system, such as a gas turbine, that is not subject to the foregoing drawbacks.

BRIEF DESCRIPTION OF THE DRAWINGS

These and other advantages of the invention will be more apparent from the following description in view of the drawings that show.

DETAILED DESCRIPTION OF THE INVENTION

Figure 1:
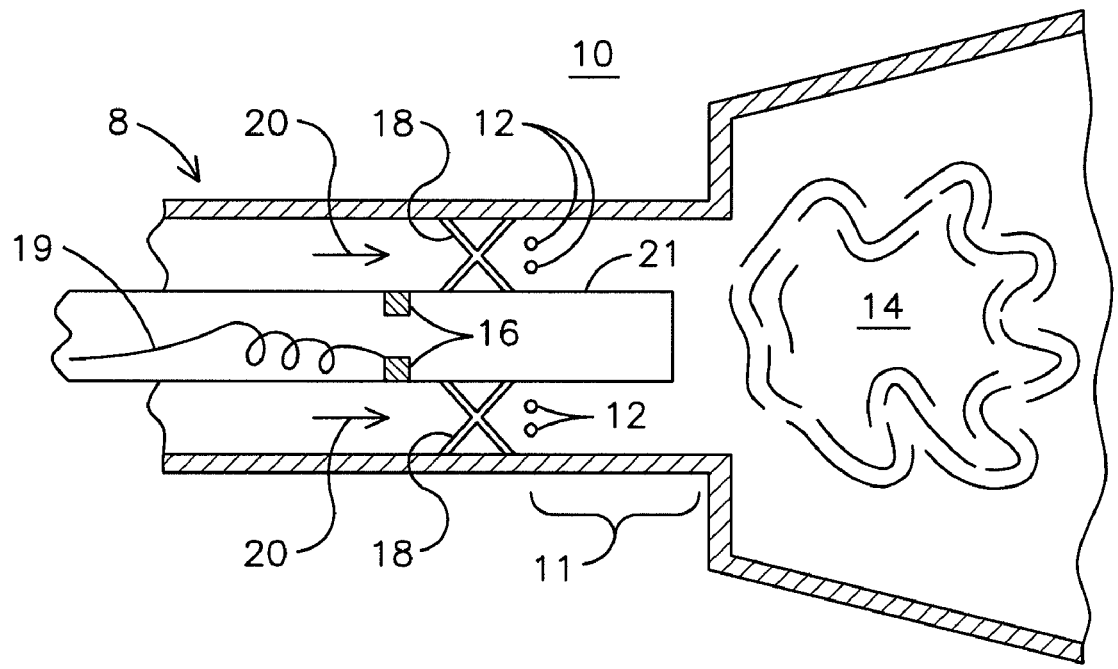
FIG. 1 is a schematic of a flashback detection device based on ion-sensing in a gas turbine, in accordance with one example of an arrangement embodying aspects of the present invention.

Prior to the present invention, it has been a conventionally accepted practice for the typical location of an ion-based flashback detector (in a premix fuel nozzle 8 (FIG. 1) of a gas turbine 10) to be in a premixing zone 11 between a point of fuel injection (or a plane or a region of fuel injection as may be defined by a plurality of fuel injecting devices 12) and a main burning zone 14. That is, such a conventionally accepted practice requires the detector to be positioned downstream of the fuel injecting device/s 12, e.g., fuel injectors or fuel pegs.

Inapposite to the teachings of this conventional practice, the inventors of the present invention have innovatively recognized an improved arrangement for the ion-sensing element. More particularly, as illustrated in FIG. 1, this improved arrangement allows placing an ion-sensing element 16 upstream of the point (plane, or region) of fuel injection. This arrangement is believed to result in appropriate flashback detection with a more feasible and manageable geometry. The exemplary embodiment of FIG. 1 illustrates one electrode ring as the ion-sensing element. It will be understood, however, that the concepts of the present invention are not limited to any particular electrode shape or electrode size since the electrode shape or size may be suitably tailored, based on the specific needs of a given flashback sensing application.

Figure 5:
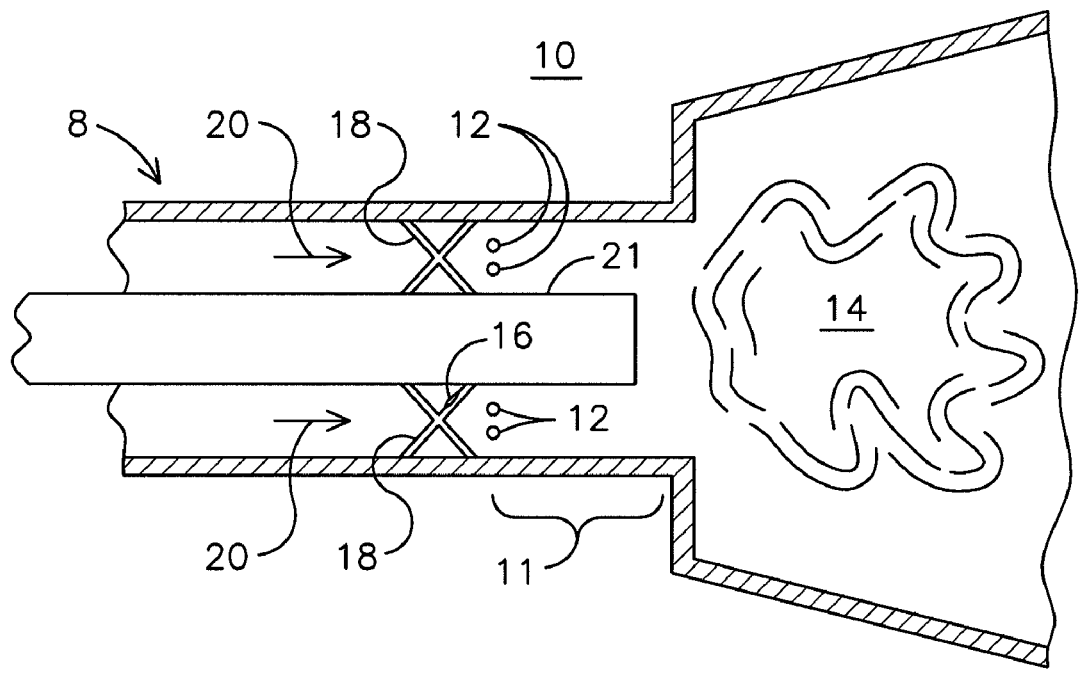
FIG. 5 is a schematic of a flashback detection device in accordance with another example of an arrangement embodying aspects of the present invention.
Figure 6:
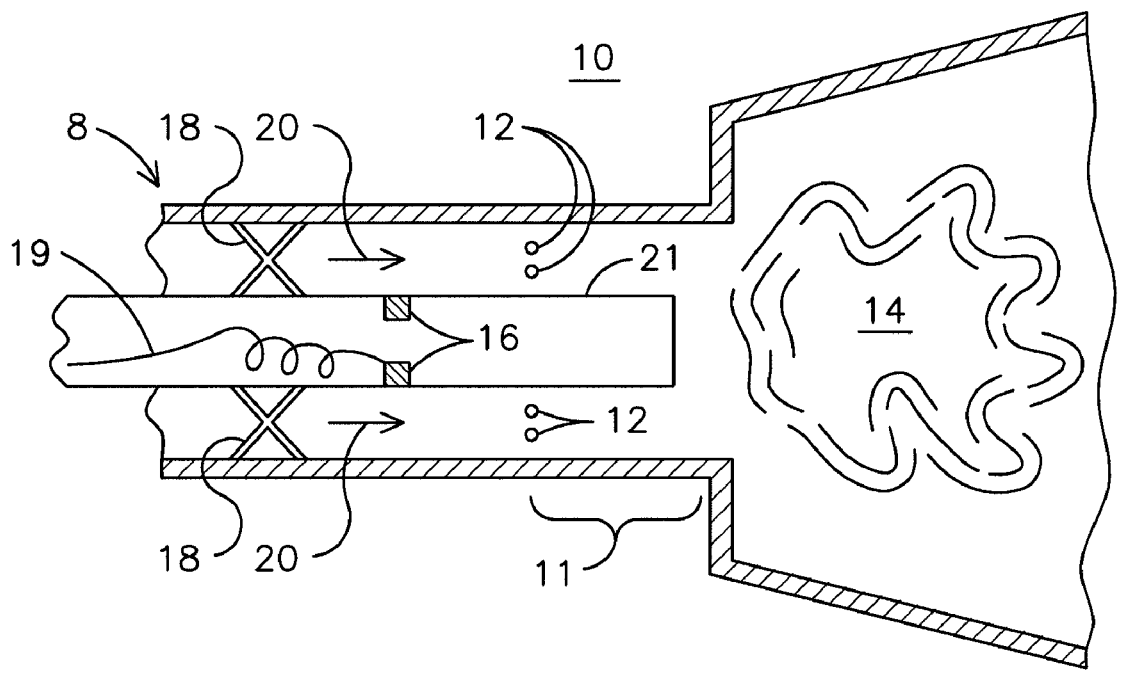
FIG. 6 is a schematic of a flashback detection device in accordance with yet another example of an arrangement embodying aspects of the present invention.

FIG. 1 further illustrates an exemplary embodiment where the ion-sensing element 16 is positioned upstream with respect to a plurality of swirler or mixing vanes 18. As will be understood by those skilled in the art, the plurality of swirler vanes 18 may be disposed across the path of a flow of a compressed gas 20, e.g., air, as may be received from a compressor section (not shown) of the turbine to impart a swirling pattern to the air and facilitate the mixing of the fuel and air. It is noted that in this exemplary embodiment care should be exercised to ensure that blockage of the field of detection of the ion-sensing element 16 (that could occur due to the presence of the swirler vanes 18) does not result in a substantially attenuated flashback response signal that may interfere with or prevent flashback detection. For example, signal attenuation may vary based on swirl vane angle and other geometrical considerations, such as vane size, vane gap, open area, etc. It is contemplated that in alternative embodiments one could integrate the ion-sensing element 16 directly onto the swirler or mixing vanes 18, as shown in FIG. 5. For example, such integration may use a suitable insulator between the "sensor" part of the metal swirl vane and the non-sensing part. The sensing part and the insulator would be mechanically joined to the non-sensing part using techniques well-understood by those skilled in the art. Alternatively, one could locate the ion sensing element 16 to be downstream of the mixing vanes, and upstream of the point (plane or region) of fuel injection, as shown in FIG. 6.

The ion-sensing element 16 is electrically insulated from the fuel nozzle, and one or more electrical leads 19 may be routed through an internal passageway at a central hub 21 of the fuel nozzle. Alternatively, the electrical leads can be routed externally or internally with respect the body of the fuel nozzle depending on the specific needs of a given application.

Figure 2:
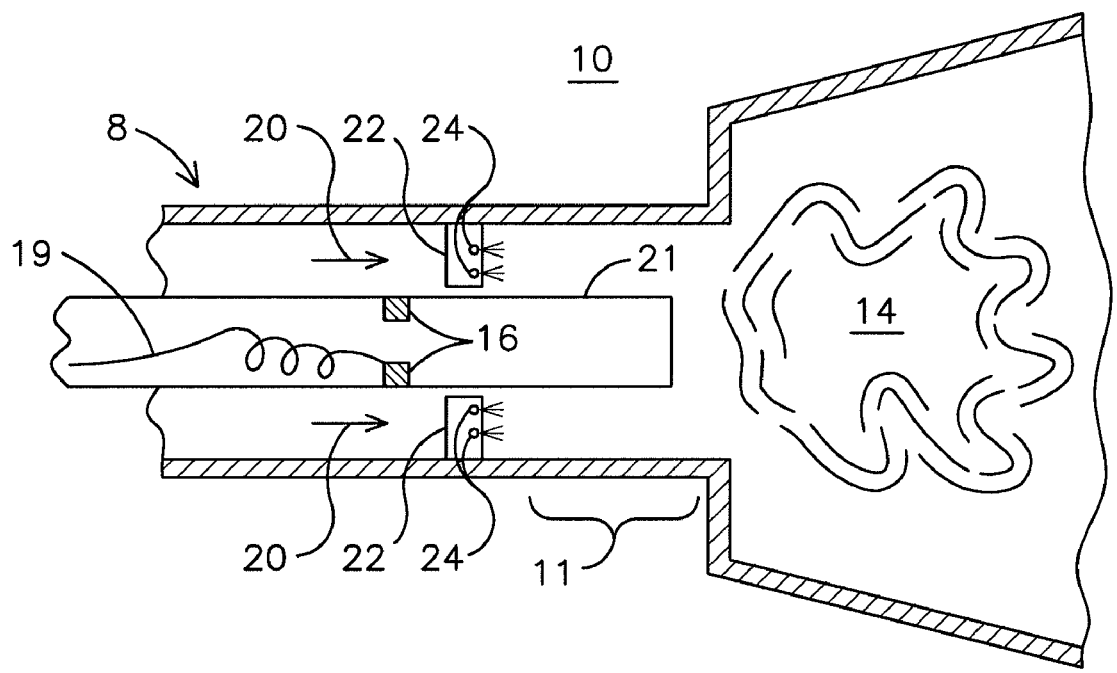
FIG. 2 is a schematic of a flashback detection device based on ion-sensing, in accordance with another example of an arrangement embodying aspects of the present invention.

As illustrated in FIG. 2, an alternative way of injecting fuel into the premixing zone may be accomplished by way of a plurality of fuel pegs 22, such as may comprise generally tubular-shaped members that project into the premixing zone and include a plurality of fuel outlet openings 24, which in this case define the plane of fuel injection. The fuel pegs may be supported in cantilever fashion from central hub 21 or from a shroud at the periphery of the fuel nozzle, or may be supported at each end of their tubular structure. It will be appreciated that the fuel pegs may be used individually or in combination with swirler vanes, and could be positioned, either upstream or downstream with respect to the swirler vanes. It is also possible to inject fuel from the swirl vanes themselves. In this case, the swirl vanes would function as the fuel injecting device. Thus, the relative location and geometries of the foregoing swirl and/or fuel injecting components may be varied to accommodate the needs of a given burner application.

Figure 3:
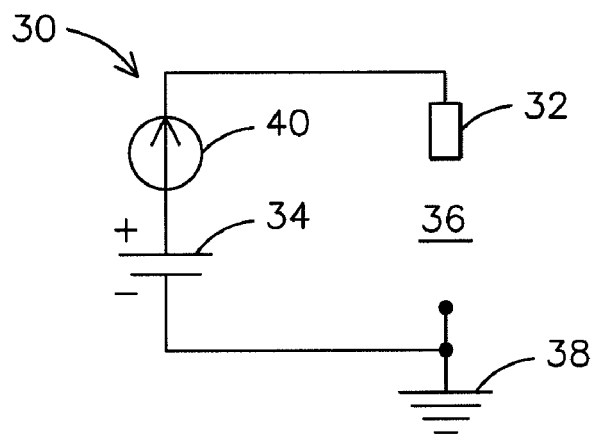
FIG. 3 represents a simplified schematic of an ion-sensing circuit including an ion-sensing element that may be arranged in accordance with aspects of the present invention to be upstream of a point of fuel injection.

FIG. 3 illustrates a simplified schematic of an ion-sensing circuit 30 for an exemplary flashback detector, including an ion-sensing element or electrode 32 that may be arranged in accordance with aspects of the present invention to be upstream of a point plane or region of fuel injection. A voltage source 34 is used for applying a desired voltage level to electrode 32. A gap 36 is disposed between the electrode 32 and ground 38. During a flashback condition, the presence of electrically charged particles, (e.g., ions) enables a circuit path to be established between the electrode 32 and ground 38, and, in response to the concentration of ions, an electrical current is formed. The strength of this current may be measured by a current sensor 40.

It can be shown that the strength of this current is generally a function of at least the following exemplary factors or parameters: The level of voltage applied by the voltage source 34; the proximity of the electrode to the source of the charged particles (proximity to a flame front); the surface area of the electrode; the rate of formation of electrically charged species; the convection of electrically charged species, such as towards or away from the electrode; and the rate of recombination of charged species to an electrically neutral state. Generally, the last three factors are not with the control of the designer. However, the first three factors listed above, singly or in combination, may be suitably varied to accommodate the requirements of a given burner application.

Figure 4:
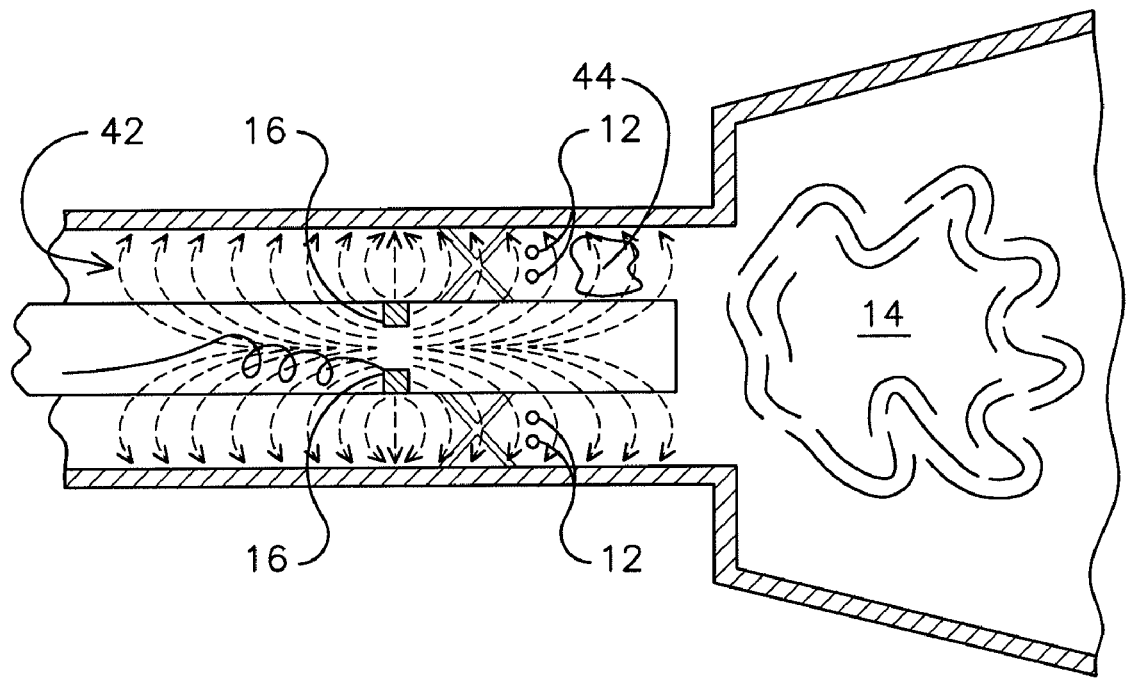
FIG. 4 is schematic view of an exemplary field of detection of an ion-sensing element, as may be positioned in accordance with aspects of the present invention for detecting a flashback condition in a premixing zone and reducing noise effects from a flame in the main combustion zone.

FIG. 4 is a schematic view of a conceptual field of detection 42 of ion-sensing element 16 with respect to a flashback 44 and further with respect to the main combustion zone 14. It is noted that one exemplary advantage that results from an arrangement in accordance with aspects of the present invention is the ability to distinguish with a single electrode the flashback 44 from the flame in the main combustion zone 14. This arrangement is well-suited to extend the detection field 42 of the ion-sensing element sufficiently far downstream from the point (plane or region) of fuel injection, as may be defined by fuel injecting devices 12, so as to accurately and consistently detect the flashback while limiting the range of the detection field of the ion sensing element so that any signal that could result from the flame in the main combustion zone 14 is sufficiently weak. It is believed that an arrangement in accordance with aspects of the present invention provides an appropriate balance to the foregoing detection considerations so that a level of flashback signal with respect to background noise is sufficiently high to provide an appropriate level of flashback detection.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim as our invention:

1. Apparatus for detecting a flashback condition in a premixing fuel nozzle of a gas turbine, the premixing fuel nozzle having a centerbody within and configured to pass a flow of air to be mixed with a fuel in a premixing zone, said apparatus comprising:

at least one fuel injecting device positioned to define a point, plane, or region of fuel injection in the premixing zone of the premixing fuel nozzle; and an electrode positioned upstream of the point, plane, or region of fuel injection and positioned within the premixing fuel nozzle, said electrode having a field of detection sufficiently sensitive to sense a flashback condition that can occur in the premixing zone; and a plurality of swirler vanes swirling the flow of air about the centerbody interposed between the fuel injecting device and the electrode.

2. The apparatus of claim 1 wherein the fuel injecting device comprises a fuel injector.

3. The apparatus of claim 1 wherein the fuel injecting device comprises a fuel peg.

4. A method for detecting a flashback condition in a premixing fuel nozzle of a gas turbine, the premixing fuel nozzle having a centerbody within and being configured to pass a flow of air to be mixed with a fuel in a premixing zone, said method comprising:

defining a point, plane, or region of fuel injection in the premixing zone of the premixing fuel nozzle; and positioning an electrode upstream of the point, plane, or region of fuel injection within the premixing fuel nozzle, the electrode having a field of detection sufficiently sensitive to sense a flashback condition that can occur in the premixing zone; and interposing a plurality of swirler vanes swirling the flow of air about the centerbody between the point of fuel injection and the electrode.

5. The method of claim 4, wherein the point of fuel injection is defined by a fuel injector.

6. The method of claim 4, wherein the point of fuel injection is defined by a fuel peg.

7. The method of claim 4 further comprising adjusting at least one parameter that affects a field of detection of the electrode, said parameter being adjusted to achieve a first level of detection sensitivity in response to a flashback condition in the premixing zone; said parameter being further adjusted to achieve a second level of detection sensitivity in response to a flame in a main combustion zone spaced apart from the premixing zone, wherein a ratio of the first level of detection sensitivity over the second level of detection sensitivity is selected sufficiently high to reduce effects from the flame in the main combustion zone with respect to the flashback condition in the premixing zone.

\* \* \* \* \*